United States Patent

[11] 3,560,799

[72] Inventor Philip J. Bochicchio
Ellicott, Md.

[21] Appl. No 769,589
[22] Filed Oct. 22, 1968
[45] Patented Feb. 2, 1971
[73] Assignee The United States of America as represented by the Secretary of the Army

[54] BUS BAR BUILDING BLOCK ASSEMBLY
10 Claims, 4 Drawing Figs.

[52] U.S. Cl. .... 317/101, 339/22; 174/88; 339/17
[51] Int. Cl. .... H02b 1/02
[50] Field of Search .... 317/101, 101DH, 101CC; 339/22B, 22, 17MLM; 174/88B (Cursory)

[56] References Cited

UNITED STATES PATENTS

| | | | |
|---|---|---|---|
| 2,799,837 | 7/1957 | Powell | 317/101DH(UX) |
| 3,147,404 | 9/1964 | Sinner | 317/101DH(UX) |
| 3,252,123 | 5/1966 | Maps, Jr. et al. | 339/22B(UX) |
| 3,368,117 | 2/1968 | Pound et al. | 317/101DH(UX) |
| 3,383,458 | 5/1968 | Raskhodoff et al. | 174/88B(UX) |
| 3,470,421 | 9/1969 | Shore et al. | 317/101DH(UX) |

*Primary Examiner*—David Smith, Jr.
*Attorney*—John R. Utermohle

ABSTRACT: An apparatus for removably retaining preformed circuit cards in prearranged circuit configuration, wherein a panelboard bus bar, building block assembly comprises a plurality of bus bars, with apertures therethrough, affixed to a switchboard, having similar apertures therein, situated so that the preformed circuit cards can be removably plugged into the panelboard and bus bar assembly simultaneously.

INVENTOR
PHILIP J. BOCHICCHIO

BY

ATTORNEY

INVENTOR
PHILIP J. BOCHICCHIO
BY
[signature]
ATTORNEY

BUS BAR BUILDING BLOCK ASSEMBLY

FIELD OF THE INVENTION

The present invention relates to a pluggable circuit-board assembly, and more particularly to a bus bar, building block assembly for removably retaining pluggable, performed circuit cards in prearranged circuit configuration.

PRIOR ART

In prior art circuit-building-block devices, preformed circuit cards are plugged into a panelboard, and terminals on the panelboard are connected to some form of bus bar assembly located along the side of the panel board. This results in a large number of connections, less space for the operable circuits in a given area, and less effective bypass voltages than in the present invention. Prior art devices, such as those shown in U.S. Pat. Nos. 3,157,767 to Schellack, issued Nov. 3, 1964; 2,963,626 to DuVal, Jr. et al., issued Dec. 6, 1960; and 2,929,965 to Oden, issued Mar. 22, 1960, are not concerned with the circuit flexibility and repair capability inherent in the present invention. The devices in these patents, although having pluggable panelboards, are concerned with soldering the plug-in component, or performed circuit card, to the bus bars. These prior art devices are concerned with forming a specific circuit. The DuVal and Oden patents disclose pluggable conductor strips, as opposed to pluggable bus bars. These prior art devices still have the inherent disadvantage of wiring being required from the bus bar assembly to the panelboard assembly.

If the mounting board assembly of the present invention is utilized for high-speed digital signals, coaxial cable would be required to connect the bus bar assembly to the panelboard, with the inherent critical space disadvantages, if the technique of the prior art were utilized. The Schellack patent is concerned with physically connecting the components in an electronic modular structure to a bus bar supply. These components are not plugged into the bus bars, but rather placed through apertures in proximity to the bus bars, the component leads contacting the sides of the bus bars instead of extending into apertures in the bus bars. The component connections to the bus bars are made by deforming the leads by bending, so as to have the lead contact the appropriate bus bar, and then soldering the lead to the desired bus bar. This structure does not provide the flexibility of easy maintenance which is inherent in the present invention, wherein the defective preformed circuit card may be easily removed from the bus bar, building block assembly and another one rapidly inserted in its place, without any need for any desoldering of connections. Nor does this structure appear to be able to allow the packing density available in the present invention. None of the prior art devices, previously mentioned, has pluggable bus bars and, thus, the complete, simultaneous, flexible insertion capability of the present invention, wherein, with one insertion, the preformed circuit cards may be removably plugged into the panelboard and bus bar assembly simultaneously, or rapidly removed therefrom, the sole electrical connection between the bus bar assembly and the prearranged circuit on the panelboard being through the removably pluggable, preformed circuit cards.

SUMMARY OF THE INVENTION

An object of the present invention is to provide a new and improved bus bar, building block assembly.

Another object of the present invention is to provide a new and improved bus bar, building block assembly for removably retaining pluggable, preformed circuit cards.

A still further object of the present invention is to provide a new and improved bus bar, building block assembly for removably retaining pluggable, preformed circuit cards in prearranged circuit configuration, the sole electrical connection between the bus bar assembly and the prearranged circuit being through the removably pluggable, preformed circuit cards.

A bus bar, building block assembly for removably retaining pluggable, preformed circuit cards in prearranged circuit configuration, embodying c certain features of the invention may include a panelboard building block, having a first plurality of apertures therethrough for removably retaining selected portions of the pluggable, preformed circuit cards; a prearranged circuit mounted on the panelboard in contiguous relation with the first plurality of apertures to allow pluggable contact of the selected portions of the preformed circuit cards with the prearranged circuit; and a bus bar assembly, having a second plurality of apertures therethrough, for removably retaining other selected portions of the pluggable, preformed circuit cards, associated with the panelboard, the first plurality of apertures and the second plurality of apertures situated so as to allow the preformed circuit cards to be removably pluggable into the panelboard and the associated bus bar assembly simultaneously, the sole electrical connection between the bus bar assembly and the prearranged circuit being fully removable, pluggable, preformed circuit cards.

Other objects and many of the intended advantages of this invention will be readily appreciated as the invention becomes better understood with reference to the following description, when taken in conjunction with the following drawings wherein.

Figure 1:
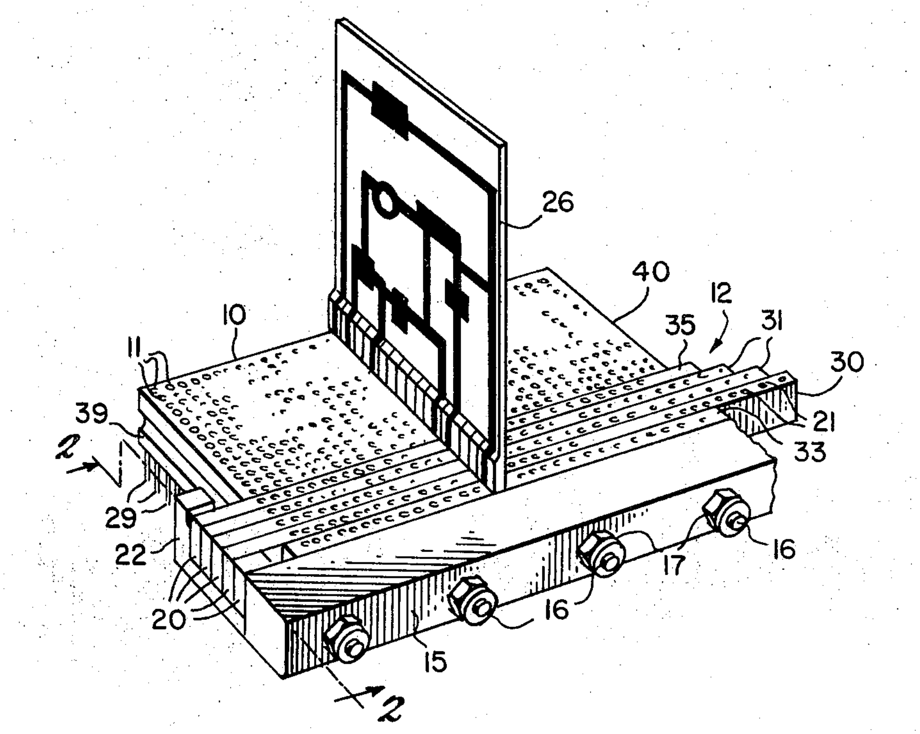
FIG. 1 is a perspective view of a preferred embodiment of the present invention.

Referring now to FIG. 1, which is a perspective view of a preferred embodiment of the present invention, a panelboard 10 having a plurality of apertures 11–11 therethrough is adjacent to a bus bar assembly 12. The bus bar assembly 12 is affixed to the panelboard 10 by means of a mounting block 15 and threaded bolts 16–16 and nuts 17–17. The bus bar assembly 12 comprises a plurality of bus bars 20–20, each of which has a plurality of apertures 21–21 therethrough. The bus bar assembly 12 is held together, in the preferred embodiment, by means of the bolts 16–16, nuts 17–17 and a clamping bar 22. In the preferred embodiment, the apertures 11–11 in the panelboard 10, and the apertures 21–21 in the bus bars 20 are arranged in parallel rows, each row of apertures extending across the bus bar, building block assembly generally designated by the numeral 25, so that with one insertion of a preformed circuit board card such as that designated by the numeral 26, simultaneous connection to the bus bar assembly 12 and to the panelboard 10 is accomplished.

The panelboard 10 is merely a mounting board for a plurality of preformed circuit cards like the card 26, containing a plurality of pins 29–29, which may be wire wrapped, in conventional fashion, on the underside of the panelboard 10, to form the prearranged circuit configuration of the building block.

The bus bar portion 12 of the bus bar, building block assembly 25 includes a bus bar 30 at a reference potential, two power supply bus bars 31–31, each power supply bus 31 being of a differing potential from the other, a guide pin block 33 and a clock-line bus 35. The guide pin block 33 is not a bus bar, but merely serves to receive a guide pin from the associated preformed circuit card 26 and guide the preformed circuit card into position, and is included with the bus bar portion 12 of the assembly merely for purposes of convenience. The purpose of the clock-line bus 35 is so that the preferred embodiment may now be used for digital logic circuitry. If such a use is not contemplated the clock-line bus 35 may be omitted from the structure.

The number of bus bars 20–20 in the bus bar assembly 12 is not critical, depending on the circuit parameters desired, nor is the arrangement critical; and a multiplicity of bus bars, such as two clock lines and five power supply bus bars may be utilized, if desired. If clock-line buses 35–35 are utilized for logic circuitry, the inherent advantages of the invention become apparent, as digital logic circuitry is affected by line length, and due to the elimination of bus bar to panelboard wire connections accomplished by the present invention, line length will be kept to a minimum.

Figure 2:
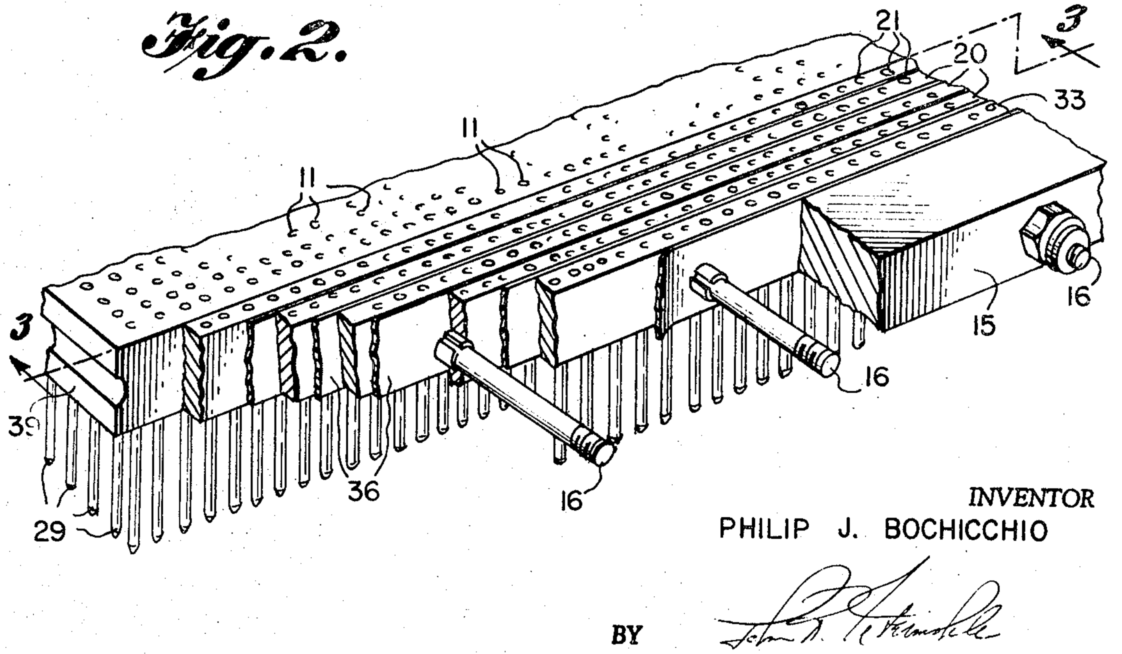
FIG. 2 is a sectional view taken along the line 2–2 of FIG. 1.

The details of the structure of the bus bar-panelboard assembly can more readily be seen by reference to FIG. 2 which is a sectional view of the bus bar, building block assembly. Each of the bus bars 20–20 is separated from the adjacent bus bar by means of an insulating strip 36, which may be one of many good insulating materials, such as Mylar. The panelboard 10 is made of insulating material. The threaded bolts 16–16, which are passed through the bus bars 20–20 in order to mount the bus bar assembly 12 on the panelboard 10, are insulated from the surrounding bus bars 20–20. The mounting block 15 and the guide pin block 33 may also be made of insulating material, although properly insulated metal may also be utilized.

The insulating strips 36–36 are placed on the bus bars 20–20 so as to form a bus bar insulation strata. The bus bar insulation strata protrudes past the panelboard 10 in order to electrically connect adjacent bus bar, building block assemblies 25 together to form larger assemblies, such as the structure shown in FIG. 4.

Figures 3, 4:
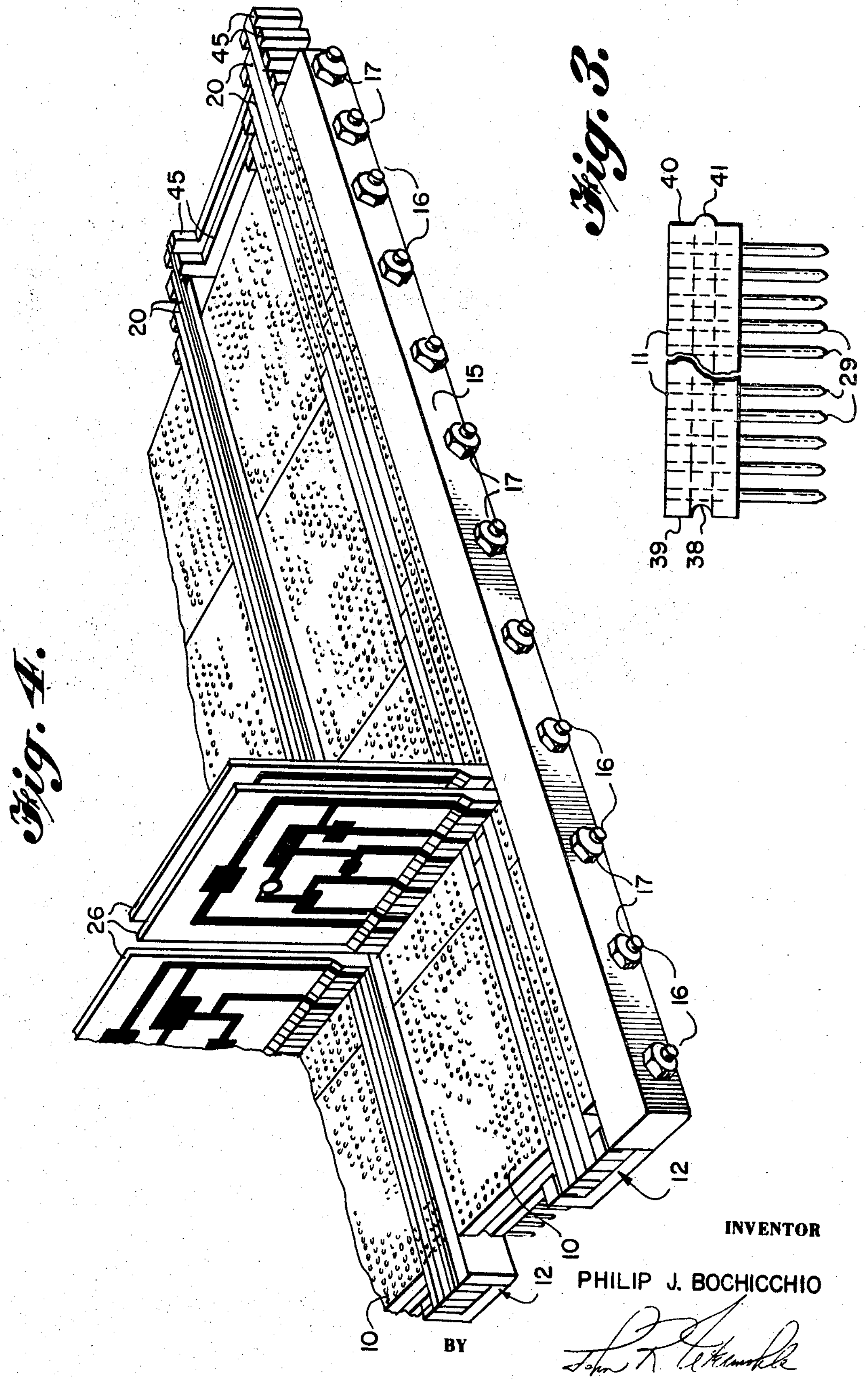
FIG. 3 is a side view taken along the line 3–3 of FIG. 1, with the bus bar assembly removed for clarity.
FIG. 4 is a perspective view of a larger assembly of several of the subassemblies shown in FIG. 1.

In order to easily accomplish the joining together of bus bar, building block assemblies 25 to form larger assemblies, the panelboard 10 has a groove 38 (FIG. 3) on one face 39 thereof and a tongue portion 41 on its opposite face 40. The tongue 41 is associated with the groove 38 in the next-succeeding panelboard 10 in order to mechanically mate adjacent panelboards together to form larger assemblies. The right hand ends of the bus bars 20–20 extend in step fashion, as is shown in FIG. 1, in order to be able to connect adjacent rows of assemblies together as is shown in FIG. 4. These connections are accomplished by means of connecting bars 45–45 which connect respective buses together to form a larger network, known as a "page," a portion of which is shown in FIG. 4. This type of circuit arrangement is particularly adapted to computer logic circuitry due to the inherent space advantages previously mentioned in that the need for coaxial cable connections between a bus bar assembly and panelboard is eliminated, thereby allowing for reduced equipment sizes, which becomes important when the basic considerations are a critical factor in design. If a given "page" size is known, several panelboards 10–10 may be connected together and the associated bus bar assemblies may be replaced by a bus bar assembly comprising continuous bus bars extending the entire length of the "page."

For the arrangement of the present invention, the line length is kept to a minimum, due to decreased wire connections, such as eliminating bus bar to panelboard connections, and, therefore, the necessity for coaxial lines in wired logic circuitry is obviated and wires of thicknesses such as ten thousandths of an inch may be used. When utilized for computer logic circuitry, as many of these building blocks as are necessary for the particular logic purpose may be used by simply physically connecting them together to form a "page."

It is to be understood that the above-described embodiment of the invention is merely illustrative of the principles thereof, and that numerous modifications and embodiments of the invention may be derived within the spirit and scope thereof, such as using a continuous mounting block and continuous bus bars in connecting adjacent panelboards together, isolating the clock-line buses by physically separating them from the power supply buses where higher speed digital circuitry demands are made, as well as other modifications thereof.

I claim:

1. A bus bar, building block assembly for removably retaining pluggable, preformed circuit cards in prearranged circuit configuration, comprising:

a panelboard building block, having a first plurality of apertures therethrough for removably retaining selected portions of the pluggable, preformed circuit cards;

a prearranged circuit mounted on the panelboard in contiguous relation with the first plurality of apertures in order to allow pluggable contact of the selected portions of the preformed circuit cards with the prearranged circuit; and a bus bar assembly, having a second plurality of apertures therethrough, for removably retaining other selected portions of the pluggable, preformed circuit cards associated with the panelboard, the first plurality of apertures and the second plurality of apertures so situated as to allow the preformed circuit cards to be removably pluggable into the panelboard and the associated bus bar assembly simultaneously, the sole electrical connection between the bus bar assembly and the prearranged circuit being through the removably pluggable, preformed circuit cards.

2. A bus bar, building block assembly in accordance with claim 1, wherein the bus bar assembly comprises a plurality of bus bars, each having the second plurality of apertures therethrough.

3. A bus bar, building block assembly in accordance with claim 2, wherein the plurality of the bus bars comprises at least one bus bar of differing potential from the remainder of the plurality of bus bars.

4. A bus bar, building block assembly in accordance with claim 3, wherein the plurality of bus bars further comprises at least one bus bar of a reference potential.

5. A bus bar, building block assembly in accordance with claim 4, wherein the plurality of bus bars further comprises at least one clock-line bus.

6. A bus bar, building block assembly in accordance with claim 2, wherein the plurality of bus bars comprises:

one bus bar of reference potential;

at least one clock-line bus bar; and a plurality of power supply bus bars, each of the power supply bus bars of differing potential from the other power supply bus bars.

7. A bus bar, building block assembly in accordance with claim 6, wherein:

the panelboard comprises a plurality of pins in association with the panelboard apertures;

the prearranged circuit comprises a wire-wrapped circuit, wire wrapped about the plurality of pins, for connecting selected apertures in the panelboard to the selected portions of the preformed circuit; and the bus bar assembly is adjacent to the panel board, the other selected portions of the preformed circuit boards being removably connected to the bus bar assembly so that with one insertion, by solely removably plugging the preformed circuit cards into the bus bar, building block assembly, the preformed circuit cards are operational, all the necessary circuit connections being accomplished.

8. A bus bar, building block assembly in accordance with claim 7, wherein:

each of the plurality of bus bars is adjacent to and insulated from each other, so as to form a strata of bus bar and insulation throughout the plurality of bus bars, the bus bar insulation strata being mounted on the panelboard;

the panelboard is an insulator; and a strip having a third plurality of apertures therethrough, is adjacent to the panelboard and intermediate the panelboard and bus bar assembly for receiving preformed circuit-card guide pins to guide the preformed circuit cards into proper position.

9. A bus bar, building block assembly in accordance with claim 8, wherein:

the bus bar insulation strata mounted on the panel board protrudes past the panelboard in order to be able to electrically connect adjacent bus bar, building block assemblies together to form larger assemblies; and opposite ends of the panelboard have a tongue and a groove for the tongue, respectively, in order to be able to mechanically mate adjacent panelboards together to form the larger assemblies.

10. A bus bar, building block assembly in accordance with claim 9, wherein the protrusion of the bus bar insulation strata comprises a plurality of bus bar connecting bars mechanically and electrically connected to the bus bar insulation strata at one end for electrically connecting adjacent bus bar, building block assemblies together to form the larger assemblies.